United States Patent
Patel

(10) Patent No.: US 7,613,438 B2
(45) Date of Patent: Nov. 3, 2009

(54) METHOD FOR REDUCING THE EFFECT OF IMPULSE NOISE IN A MOTOR VEHICLE RADIO

(75) Inventor: Vipul M. Patel, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 773 days.

(21) Appl. No.: 11/053,990

(22) Filed: Feb. 9, 2005

(65) Prior Publication Data

US 2006/0178123 A1 Aug. 10, 2006

(51) Int. Cl.
*H04B 1/10* (2006.01)
(52) U.S. Cl. .................. 455/223; 455/296; 375/346
(58) Field of Classification Search .............. 455/222, 455/223, 296; 375/346
See application file for complete search history.

(56) References Cited

U.S. PATENT DOCUMENTS

| | | | | |
|---|---|---|---|---|
| 3,699,457 A * | 10/1972 | Wright | ..................... | 455/224 |
| 5,890,059 A * | 3/1999 | Shoemaker et al. | ......... | 455/297 |
| 6,292,654 B1 * | 9/2001 | Hessel et al. | ................ | 455/223 |
| 6,539,052 B1 * | 3/2003 | Hessel et al. | ................ | 375/225 |
| 2001/0044289 A1* | 11/2001 | Tsuji et al. | .................. | 455/296 |

* cited by examiner

Primary Examiner—Nhan T Le

(57) ABSTRACT

Methods are provided for reducing impulse noise effects in a motor vehicle radio. One method includes the steps of first detecting impulse noise received by the motor vehicle radio. The received impulse noise is classified as either short pulse width impulse noise or as long pulse width impulse noise. The short pulse width impulse noise can generally be blanked without seriously affecting the audio quality of the radio. For the long pulse width impulse noise, a maximum long pulse width blanking repetition rate is set and such impulse noise pulses are blanked at a blanking rate less than the maximum long pulse width blanking repetition rate.

7 Claims, 3 Drawing Sheets

METHOD FOR REDUCING THE EFFECT OF IMPULSE NOISE IN A MOTOR VEHICLE RADIO

TECHNICAL FIELD

The present invention generally relates to a motor vehicle radio, and more particularly relates to reducing the effect of impulse noise in a motor vehicle radio with minimum impact on the audio quality of the sound produced by the radio.

BACKGROUND

A motor vehicle is a noisy environment for radio reception. Impulse type noise, for example, is a particularly troublesome source of interference to motor vehicle radio reception. There are multiple sources of impulse type noise in a motor vehicle. Some of the noise sources, such as brake switches and turn signals, produce impulse noise pulses that individually are characterized by a relatively low repetition rate and a relatively long pulse width. In contrast, other sources such as the ignition system produce impulse noise pulses that are of relatively short pulse width. Ignition system noise is characterized by a variable repetition rate, with the rate changing with the engine speed.

A conventional motor vehicle radio attempts to eliminate the effect of impulse type noise by blanking such noise signals. If the radio attempts to blank all noise signals, however, the effect of such blanking may be discerned by the listener as a distorted audio signal. If, however, sufficient blanking is not applied, the audio quality is again impaired because the normal audio is punctuated by pops or cracks caused by the noise signals. In an attempt to provide sufficient blanking but not to over-blank, the typical motor vehicle radio sets a fixed maximum blanking time and a fixed repetition rate. Such typical settings, however, are sub-optimized for dealing with the different noise sources. The result is sub-optimized audio reception on motor vehicle radios.

Accordingly, it is desirable to provide a method for reducing the effect of impulse noise in a motor vehicle radio to optimize the audio quality of motor vehicle radio reception. Furthermore, other desirable features and characteristics of the present invention will become apparent from the subsequent detailed description and the appended claims, taken in conjunction with the accompanying drawings and the foregoing technical field and background.

BRIEF SUMMARY

Methods are provided for reducing impulse noise effects in a motor vehicle radio. One method includes the steps of first detecting impulse noise received by the motor vehicle radio. The received impulse noise is classified as either short pulse width impulse noise or as long pulse width impulse noise. The short pulse width impulse noise can generally be blanked without seriously affecting the audio quality of the radio. For the long pulse width impulse noise, a maximum long pulse width blanking repetition rate is set and such impulse noise pulses are blanked at a blanking rate less than the maximum long pulse width blanking repetition rate.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
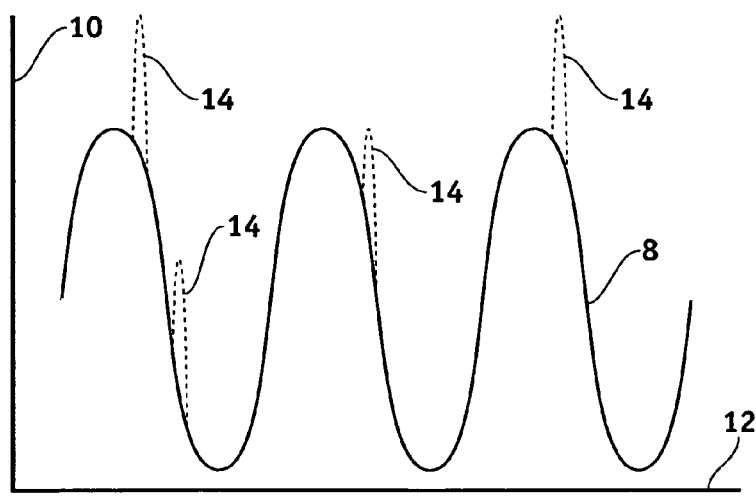
FIGS. 1-3 illustrate examples of impulse noise spectrum superimposed on a received radio signal.
Figure 2:
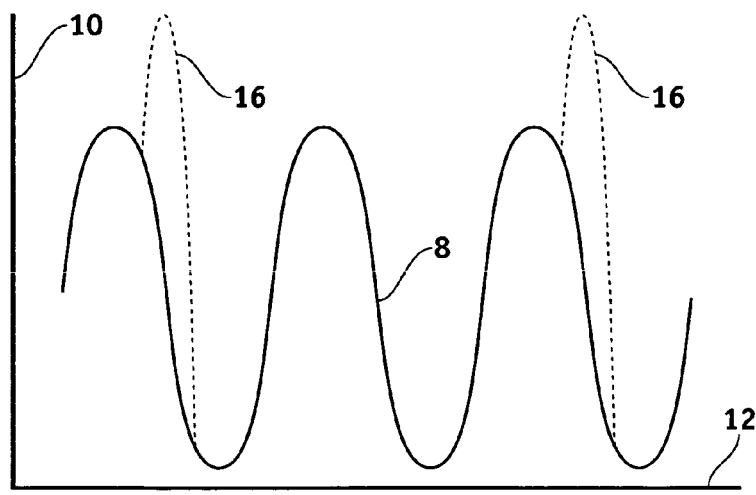
Figure 3:
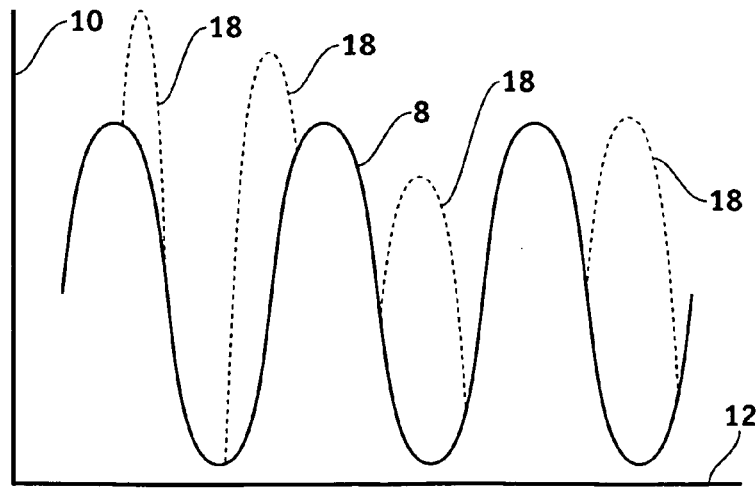

FIGS. 1-3 graphically illustrate examples of impulse noise spectrum that may be experienced in a motor vehicle radio receiver. The impulse noise spectrum is shown superimposed on an illustrative received radio signal 8. In each of FIGS. 1-3 vertical axis 10 indicates signal magnitude and horizontal axis 12 indicates time. It is well known that impulse noise pulses can be blanked by a motor vehicle radio. Blanking is the act of blocking transmission of a portion of the spectrum received by the radio tuner. The act of blanking a noise impulse also blanks the radio signal received simultaneously with the noise impulse. Excessive blanking of noise signals will blank or cut out a noticeable amount of the received radio signal and such excessive blanking will be perceived by the listener as a distortion of the received signal.

FIG. 1 illustrates a plurality of short pulse width impulse noise pulses 14 superimposed on illustrative received radio signal 8. As used herein the term "short pulse width" shall mean a pulse width of less than about 200 nanoseconds (ns). Such short pulse width impulse noise pulses can usually be effectively blanked without causing significant deterioration of received radio signal 8 because only a small portion of the received radio signal is blocked.

FIG. 2 illustrates a plurality of long pulse width impulse noise pulses 16 superimposed on illustrative received radio signal 8. In this illustrative figure the impulse noise pulses occur at a low repetition rate. Long pulse width impulse noise pulses occurring at such a low repetition rate also can effectively be blanked without causing significant deterioration of received radio signal 8, again because only a small portion of the received radio signal is blocked.

FIG. 3 again illustrates a plurality of long pulse width impulse noise pulses 18 superimposed on illustrative received radio signal 8. In contrast to the previous figure, however, noise pulses 18 occur at a high and not necessarily regular repetition rate. Long pulse width impulse noise pulses such as noise pulses 18 that occur at a high repetition rate cannot all be blanked without causing a significant deterioration in the audio quality perceived by a listener of the motor vehicle radio. Blanking all long pulse width impulse noise pulses 18 will cause the blocking of a significant portion of the received radio signal and such blanking will be perceptible to the radio listener.

Figure 4:
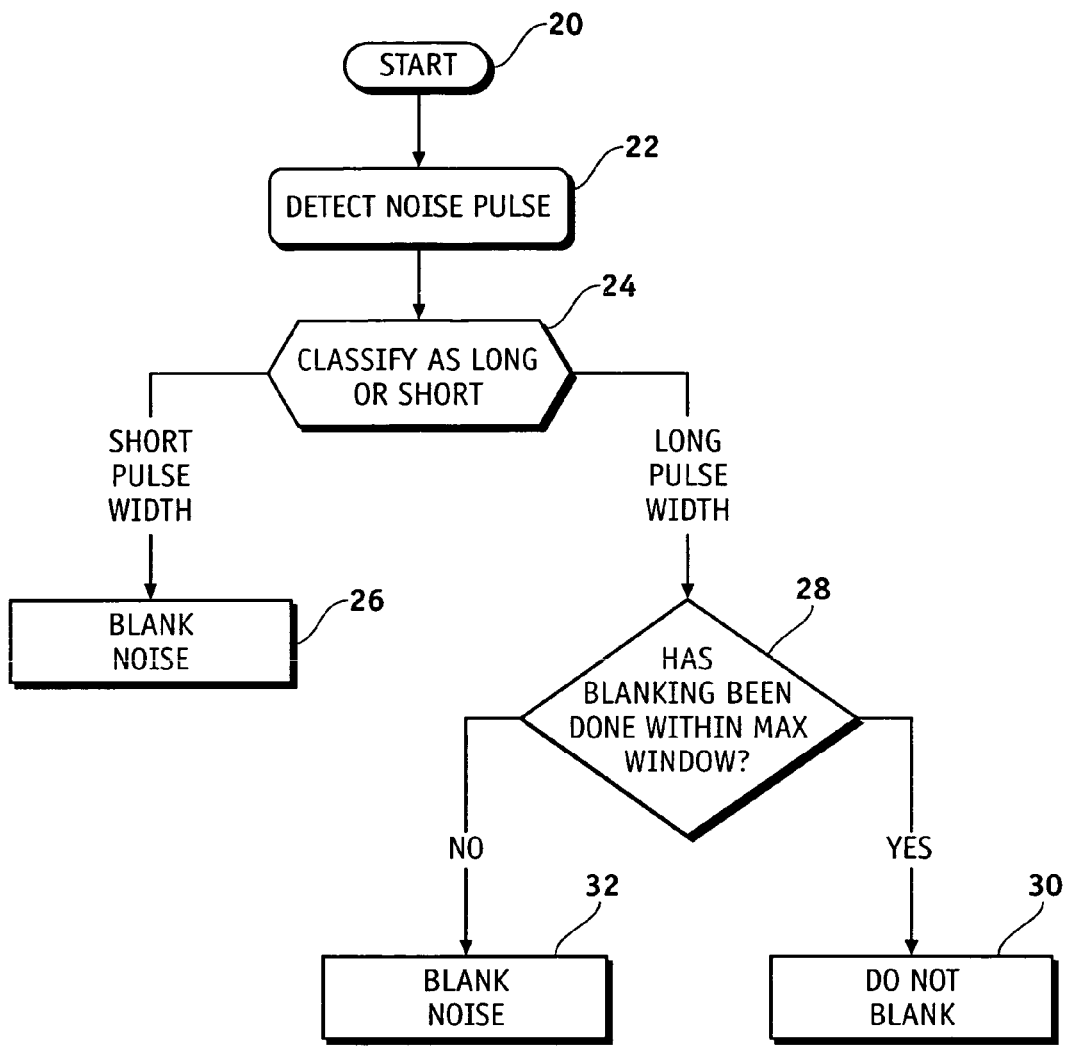
FIG. 4 illustrates schematically, in flow chart form, a method in accordance with an embodiment of the invention.

FIG. 4 illustrates, in flow chart form, a method in accordance with an embodiment of the invention by which the blanking of impulse type noise can be optimized in a motor vehicle radio. The basic process of blanking noise pulses in a radio is known to those of skill in the art and need not be explained. Steps contemplated in the inventive method can be carried out in the tuner section of the motor vehicle radio and more specifically in the tuner IF section of the motor vehicle radio.

As illustrated in FIG. 4, the method in accordance with one embodiment of the invention starts at step 20. At this point the motor vehicle is generally running and the motor vehicle radio is turned on and tuned to a radio station. At step 22 impulse noise pulses received by the radio are detected. The impulse noise pulses are detected by the radio tuner and are distinguished from the spectrum of the selected radio station. In accordance with this embodiment of the invention, at step 24 the impulse noise pulses are classified as either short pulse width impulse noise pulses or long pulse width impulse noise pulses. As used herein, the term "long pulse width" shall mean a pulse width greater than about 200 ns. The definition of "short pulse width" and "long pulse width" may depend on the particular motor vehicle radio, but for most applications a demarcation of about 200 ns is appropriate. The classification of the received impulse noise pulses can be done in the tuner of the motor vehicle radio, and especially in the tuner IF section of the radio. Digital IF tuners are particularly suited for the classification of the received impulse noise pulses.

In accordance with one embodiment of the invention, short pulse width impulse noise pulses are blanked as indicated by step 26. Preferably all such short pulse width impulse noise pulses are blanked as total blanking of such pulses can generally be done without significantly impacting the perceived radio reception quality. The blanking of long pulse width impulse noise pulses is limited to a predetermined maximum long pulse width blanking repetition rate. The maximum long pulse width blanking repetition rate, which can be set in the tuner of the motor vehicle radio, can be set to be any predetermined number of blankings per second with the exact predetermined number based on factors such as the particular radio and the motor vehicle environment (i.e., for example, the particular model of automobile in which the radio is installed). As indicated at step 28, with respect to long pulse width impulse noise pulses, a determination is made as to whether blanking has been done within a time window established by the predetermined maximum long pulse width blanking repetition rate. The time window is the period of the maximum long pulse width blanking repetition rate. Upon receipt of an impulse noise pulse that is classified as a long pulse width impulse noise pulse, if previous blanking has been done within the time window, that noise pulse is not blanked as indicated by step 30. If, instead, previous blanking has not been done within the time window, that noise pulse is blanked as indicated at step 32. By limiting the blanking of long pulse width impulse noise pulses to a repetition rate less than the predetermined maximum long pulse width blanking repetition rate, impulse type noise is reduced, but audio quality of the received broadcast is not severely impacted.

In accordance with one embodiment of the invention, the short pulse width impulse noise pulses are blanked for a blanking time commensurate with the pulse width. Long pulse width impulse noise pulses are blanked for a longer blanking time.

Figure 5:
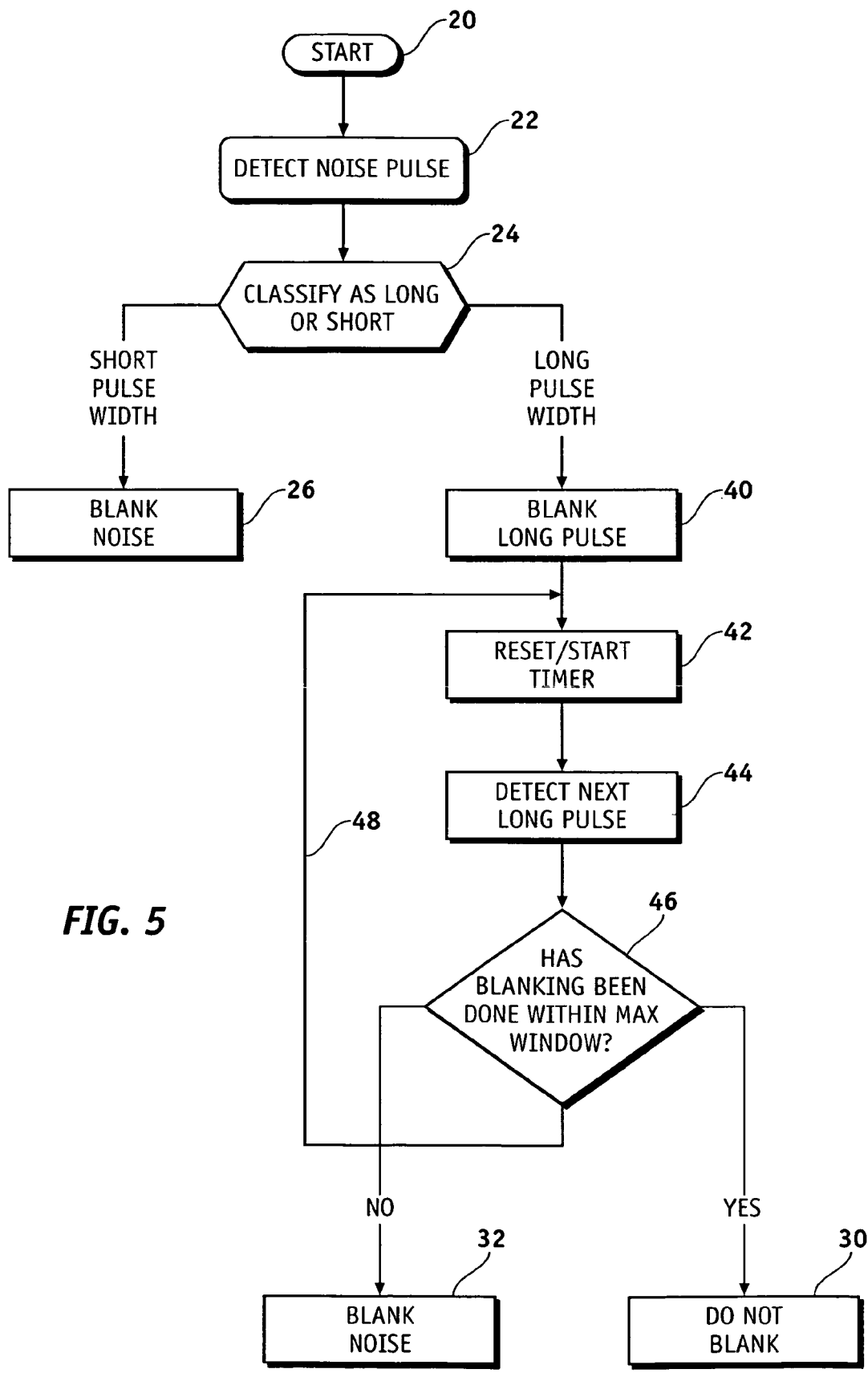
FIG. 5 illustrates schematically, in flow chart form, a method in accordance with a further embodiment of the invention.

In accordance with a further embodiment of the invention, the motor vehicle radio includes either a timer or a counter. As illustrated in FIG. 5, following the classification done at step 24, the first detected long pulse width impulse noise pulse is blanked at step 40 and simultaneously the counter or timer is started at step 42. Upon detection of a further long pulse width impulse noise pulse at step 44, the timer or counter is consulted at step 46 to determine whether the previous blanking has been done within the predetermined time window. The timer or counter is reset as indicated by line 48 and the detected long pulse width impulse noise pulse is either blanked, step 32, or not blanked, step 30, based on the determination of whether the previous blanking has been done within the predetermined time window. That is, the steps of blanking or not blanking are done based on whether the timer has exceeded a predetermined time or the counter has exceeded a predetermined count. A counters and a timer function in much the same way in this application, with the difference generally being merely a choice of the most convenient way to implement the function in a portion of the integrated circuit that makes up the tuner portion of the motor vehicle radio. Accordingly, the function and its predetermined setting will hereinafter simply be referred to as a timer and a predetermined time, respectively.

In accordance with one embodiment of the invention, all short pulse width impulse noise pulses are blanked and long pulse width impulse noise pulse are either blanked or not blanked based on the maximum long pulse width repetition rate as explained above. In accordance with a further embodiment of the invention (not illustrated), short pulse width impulse noise pulses may also be blanked or not blanked based upon a maximum short pulse width blanking repetition rate in a manner similar to that described for long pulse width impulse noise pulses. In accordance with this embodiment of the invention, the maximum short pulse width blanking repetition rate can be greater than the maximum long pulse width blanking repetition rate because the blanking time for a short pulse width impulse noise pulse is less than the blanking time for a long pulse width impulse noise pulse and thus has less effect on the perceived audio quality of the received radio broadcast. As with the maximum long pulse width blanking repetition rate as explained above, the maximum short pulse width blanking repetition rate can be set to be any predetermined number of blankings per second with the exact predetermined number based on factors such as the particular radio and the motor vehicle environment. The maximum short pulse width blanking repetition rate can be, for example 2000 blankings per second.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for reducing impulse noise in a motor vehicle radio comprising the steps of:
   detecting impulse noise received by the motor vehicle radio;
   classifying the detected impulse noise as either short pulse width impulse noise or as long pulse width impulse noise;
   blanking impulse noise classified as short pulse width impulse noise; and
   blanking impulse noise classified as long pulse width impulse noise providing a predetermined time has elapsed since a previous blanking of long impulse width impulse noise; wherein the step of blanking impulse noise classified as short pulse width impulse noise comprises the step of blanking for a time commensurate with the length of the short pulse width.

2. The method of claim 1 wherein the step of blanking impulse noise classified as long pulse width impulse noise comprises the step of blanking for a predetermined length of time greater than the time commensurate with the length of the short pulse width.

3. The method of claim 1 wherein the step of classifying comprises the step of initiating a classifying sequence in the tuner section of the motor vehicle radio.

4. The method of claim 3 wherein the step of classifying comprises the step of initiating a classifying sequence in the IF tuner section of the motor vehicle radio.

5. The method of claim 1 wherein the step of blanking impulse noise classified as long pulse width impulse noise comprises the steps of:
   blanking a first long pulse width impulse noise pulse; initiating timing by a timer; and
   blanking a second long pulse width impulse noise pulse providing the timer indicates an elapsed time greater than a predetermined time since the blanking of the first long pulse width impulse noise pulse.

6. A method for reducing impulse noise in a motor vehicle radio comprising the steps of:
   detecting impulse noise received by the motor vehicle radio;
   classifying the detected impulse noise as either short pulse width impulse noise or as long pulse width impulse noise;
   blanking impulse noise classified as short pulse width impulse noise;
   upon detection of impulse noise classified as long pulse width impulse noise:
   blanking a first long pulse width impulse noise pulse;
   initiating a timer;
   blanking a subsequent long pulse width impulse noise pulse only if the timer has exceeded a predetermined time; and
   resetting the timer upon each subsequent blanking of a long pulse width impulse noise pulse.

7. The method of claim 6 wherein the step of blanking impulse noise classified as short pulse width impulse noise comprises the step of blanking for a first blanking time and the step of blanking a first long pulse width impulse noise pulse comprises the step of blanking for a second blanking time wherein the second blanking time exceeds the first blanking time.

* * * * *